United States Patent [19]

Nolen

[11] Patent Number: 5,205,064
[45] Date of Patent: Apr. 27, 1993

[54] DEVICE FOR ATTRACTING AND DESTROYING INSECTS

[75] Inventor: James A. Nolen, West Greenwich, R.I.

[73] Assignee: James Nolen & Company, Warwick, R.I.

[21] Appl. No.: 932,348

[22] Filed: Aug. 19, 1992

[51] Int. Cl.$^5$ ............................................. A01M 1/22
[52] U.S. Cl. .................................................. 43/112
[58] Field of Search ................... 43/112, 113, 900, 98, 43/107

[56] References Cited

U.S. PATENT DOCUMENTS

| | | | |
|---|---|---|---|
| 1,823,892 | 9/1931 | Galbraith | 43/112 |
| 2,373,428 | 4/1945 | Stone | 43/112 |
| 2,661,512 | 12/1953 | Kretschmar | 43/112 |
| 3,835,577 | 9/1974 | Soulos | 43/112 |
| 3,987,578 | 10/1976 | Rueff | 43/113 |
| 4,490,937 | 1/1985 | Yavnieli | 43/112 |
| 4,506,473 | 3/1985 | Waters, Jr. | 43/107 |
| 4,694,604 | 9/1987 | Mitchell | 43/107 |
| 4,852,296 | 8/1989 | Swanson | 43/112 |
| 4,908,979 | 3/1990 | Hostetter | 43/112 |

FOREIGN PATENT DOCUMENTS

| | | | |
|---|---|---|---|
| 0631324 | 8/1992 | Switzerland . | |
| 2171882 | 9/1986 | United Kingdom | 43/112 |
| 92127060 | 10/1992 | World Int. Prop. O. . | |

Primary Examiner—Richard K. Seidel
Assistant Examiner—James Miner
Attorney, Agent, or Firm—Salter, Michaelson & Benson

[57] ABSTRACT

A device for attracting and destroying insect pests utilizes a pressurized canister charged with either carbon dioxide or octenol or a combination thereof, or with insect pheromones, in combination with infrared and/or ultraviolet lights to attract a variety of insects, including mosquitoes and biting flies which prey on humans. The pressurized canister and fluorescent light source are surrounded by an electrified grid which electrocutes the insects when they try to reach the source of the attractant. A motorized cam mechanism is utilized for periodically discharging the contents of the pressurized canister.

8 Claims, 1 Drawing Sheet

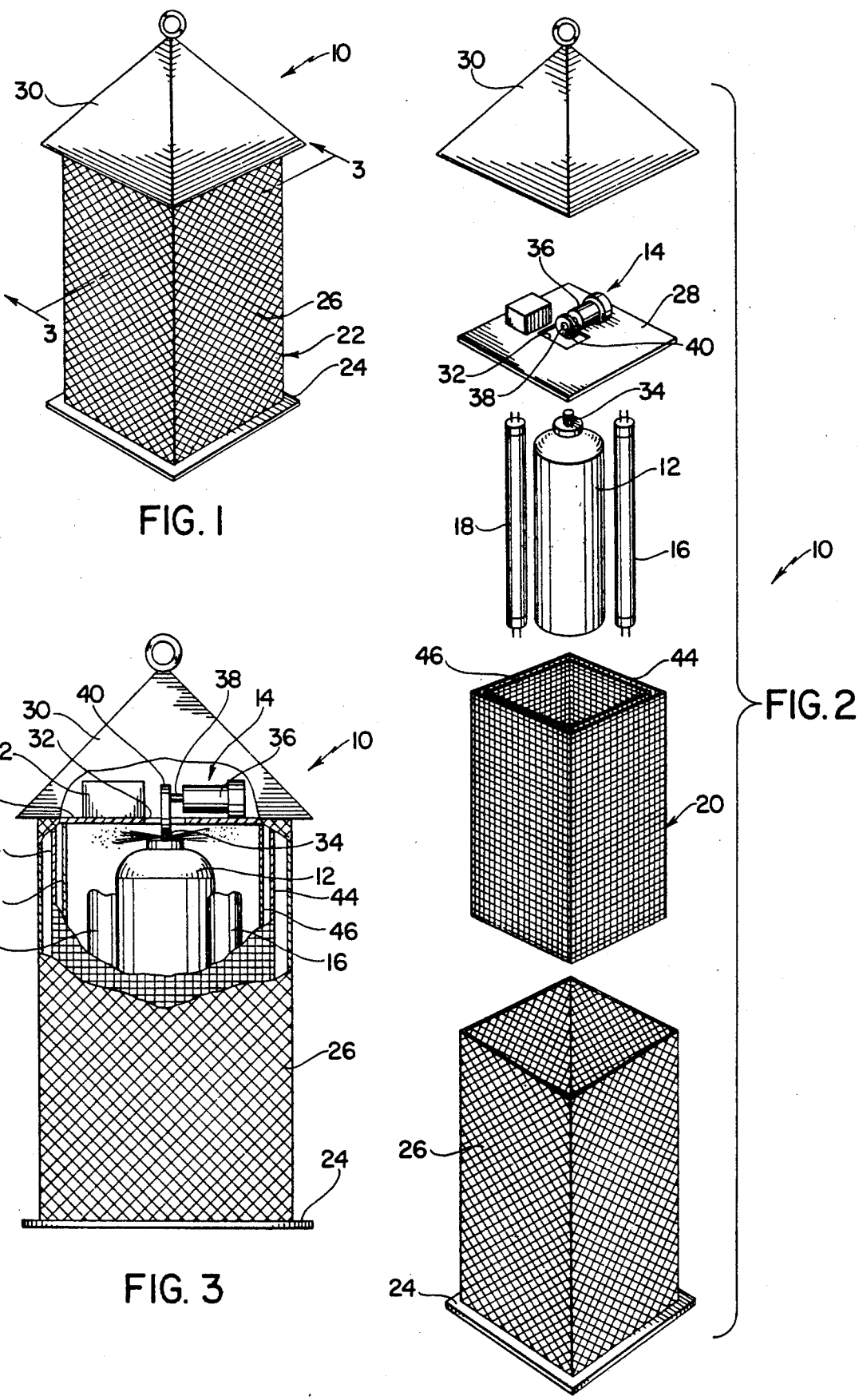

DEVICE FOR ATTRACTING AND DESTROYING INSECTS

BACKGROUND OF THE INVENTION

The instant invention relates to devices for attracting and destroying insect pests and more particularly to a device which utilizes gases such as carbon dioxide or octenol and/or insect pheromones, in combination with fluorescent lights to attract a variety of insects, including biting flies and mosquitoes.

Devices for attracting and destroying insects are well known in the art. For example, the U.S. Pat. No. 2,106,528 to Jones, et al; U.S. Pat. No. 3,187,458 to Densmore; U.S. Pat. No. 3,835,577 to Soulos: U.S. Pat. No. 3,894,351 to Iannini; U.S. Pat. No. 4,182,069 to DeYoreo: and U.S. Pat. No. 4,387,529 to Hedstrom are representative of the available prior art. The patent to Densmore discloses a device which employs a light for attracting insects and a pesticide saturated mesh surrounding the light for killing the insects attempting to reach the light source. The remaining patents to Jones, Soulos, Iannini, DeYoreo and Hedstrom disclose various devices which employ some kind of illuminating means and/or odor means for attracting insects, and an electrified screen grid for electrocuting insects attempting to reach the light or pheromone. Although these electric "bug zapping" devices are popular with consumers, each has certain shortcomings. For example, the devices employing an ultraviolet light source are effective for attracting and destroying moths but are ineffective for attracting biting insects, such as mosquitoes and flies, that prey on humans. The prior art devices which utilize pheromones as the odor source to attract specific types of insects are expensive because the pheromone source is continuously active and therefore must continually be replaced.

It has been found that biting insects locate their prey through heat (thermal radiation transmitted by infrared light) and have eyes which are sensitive to the wavelength of light emitted by carbon dioxide or octenol. In this regard, several prior art devices have suggested the use of open flames to produce heat in combination with carbon dioxide. One such device relies on the biting insect to fly directly into the open flame to be destroyed. Another device employs an electrified grid surrounding the open flame. Because of the open flame, these devices have been found to be extremely dangerous and hence have not been commercially successful.

SUMMARY OF THE INVENTION

The instant invention provides a device for safely and effectively attracting and destroying a variety of insect pests, including mosquitoes and biting flies.

Briefly, the instant invention comprises a pressurized canister charged with a gas such as carbon dioxide or octenol, with an insect pheromone, a rotating cam assembly for controlling discharge of the canister, a pair of fluorescent lamps, an electrified grid surrounding the canister and lamps, and a housing enclosing the electric grid. The housing is of a conventional design having a bottom tray, wire mesh side portions and a pyramid shaped cover. The electrified grid is also of conventional design wherein the outer screen is attached to the housing and the inner screen is suspended from the outer screen by ceramic insulators. A high voltage potential is provided to the grid by a transformer. The pressurized canister includes a spray head which is periodically actuated by the cam assembly to periodically discharge the contents of the canister. The cam assembly is driven by an electric motor which is periodically energized by a timer mechanism. More than one canister may be employed in the design wherein each canister is charged with a different compound for attracting a different type of insect pest. The fluorescent lamps preferably comprise an ultraviolet lamp for attracting moths and an infrared lamp for attracting mosquitoes and flies. The canisters and the lamps are mounted inside the grid so that the insect pests attempting to reach the attractants will be electrocuted when contacting or passing through the grid. The lamps and canister can be activated in different combinations to attract different types of insects. A photoelectric cell enables the use to activate different combinations of lights and canisters for day and night operation.

Accordingly, it is an object of the instant invention to provide a device for attracting and destroying insect pests.

It is another object to provide a device which attracts a wide variety of insects.

It is still another object to provide a device which utilizes carbon dioxide or octenol and heat to attract biting insects.

It is a further object to provide a device which uses different combinations of fluorescent light and odors to attract insects.

It is yet another object to provide a device which discharges insect attracting compounds from pressurized canisters.

It is still yet another object to provide a device which is safe and economical.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view of the device of the instant invention:

FIG. 2 is an exploded perspective view thereof; and

FIG. 3 is an elevational view thereof with portions broken away for purposes of illustration and comprising a sectional view thereof taken along line 3—3 of FIG. 1.

DESCRIPTION OF THE INVENTION

Referring now to the drawings, the device of the instant invention is illustrated and it is generally indicated at 10 in FIGS. 1 through 3. The device 10 is operable for attracting and destroying a variety of different insects including mosquitoes and biting flies which prey on humans. The device 10 comprises a pressurized canister 12, a rotatable cam assembly generally indicated at 14, a pair of fluorescent lights 16 and 18 respectively, an electrified grid generally indicated at 20 and a housing generally indicated at 22.

The housing 22 is preferably fashioned from a rugged and durable sheet metal suitable for extended outside exposure and it comprises a bottom tray 24, a wire mesh outer enclosure 26, a top mounting plate 28 and a pyramid shaped cover portion 30. The housing is constructed in a Conventional manner wherein the wire mesh outer enclosure 26 extends upwardly from the bottom tray 24 and the top mounting plate 28 is releasably attached to the upper edge portions of the enclosure 26, so that the canister 12 and fluorescent light bulbs, 16 and 18, are easily accessible and replaceable. The cover 30 is also removably secured to the outer enclosure 26 for the same reasons. The top mounting plate 28 includes a centrally located aperture 32 which allows the cam assembly 14 to communicate with the pressurized canister 12. The wire mesh enclosure 26 has a sufficient mesh spacing to allow insects to pass through the mesh to the electrified grid 20 enclosed inside. The mesh enclosure 26 effectively prevents children or pets from inadvertently coming into contact with the electrified grid 20 located therein.

The canister 12 comprises a conventional gas pressurized canister which is charged with carbon dioxide, octenol or an appropriate insect pheromone or a combination thereof. Carbon dioxide and octenol are two gases found in cow's breath, which has been found to be an effective lure for mosquitos and the like. Octenol attracts the insects from a greater distance whereas carbon dioxide attracts those that are closer, so it has been found effective to mix octenol and carbon dioxide to form one's own cow's breath formula. Carbon dioxide and octenol has long been known as an environmentally safe propellant and it is well known that carbon dioxide canisters are commercially available for different applications such as a propellent for whip cream and to carbonate soft drinks. Insect pheromones are the Chemicals through which insects communicate and are very effective for attracting insects to a trap or other device for destroying the insects. Each insect pheromones is effective for attracting one specific type of insect. The insect pheromones are commercially available for such purposes. The canisters 12 are easily charged with a desired pheromone for application in the instant device. The canister 12 is mounted to the bottom tray 24 in any suitable manner and it includes a spray head 34 at the top thereof which is actuatable for discharging the pressurized contents into the air. The canister 12 is mounted so that the spray head 34 is positioned first below the aperture 32 in the top surface of top mounting plate 28.

The cam assembly 14 comprises an electric motor 36, a rotatable drive shaft 38 extending outwardly from the motor 36, an eccentric cam 40 mounted on the end of the drive shaft 38, and a timer means (not shown) for periodically energizing the motor 36. The cam assembly 14 is mounted on the top mounting plate 28 so that the rotatable cam 40 extends downwardly through the central aperture 32 to communicate with the spray head 34 of the canister 12. When the motor 36 is energized, the cam 40 rotates so that the eccentric portion thereof moves downwardly through the aperture 32 to intermittently actuate the spray head 34 and discharge the pressurized contents from the canister 12. The timer means (not shown) is provided to periodically actuate the spray head 34 and thereby effectively control the frequency of discharge and the volume of insect attractant discharged.

In order to increase the effectiveness of the device 10 it is contemplated that more than one canister 12 may be provided. When multiple canisters are utilized, each individual canister 12 contains a different insect attractant. For example, one canister may contain pressurized carbon dioxide or octenol or a combination thereof, while another canister may contain an insect pheromone. Obviously, when more than one canister is provided, means for discharging the contents of each canister, i.e. individual cam assemblies, is also provided.

The fluorescent lights 16 and 18 comprise conventional fluorescent lamps which are mounted in conventional fluorescent lamp sockets (not shown). It is to be understood that the lamp sockets are securable to the top plate 28 and the bottom tray 24 in any suitable manner, such as by bolts which pass through the bottom tray 24 and top mounting plate 28. Preferably one of the lamps 16 comprises an ultra-violet lamp for attracting moths and the other lamp 18 comprises an infra-red lamp for attracting flies and mosquitoes.

The electrified grid 20 is powered by a high voltage electrical transformer 42 (electrical connections not shown) and it comprises an outer mesh screen 44 and an inner mesh screen 46. The outer screen 44 is secured to the bottom tray 24 and the inner screen 46 is supported from the outer screen 44 by a plurality of electrical insulators (not shown). The inner and outer screens 44 and 46 are spaced by a distance which is determined in conjunction with the voltage output of the transformer 42 so as to prevent spark discharge from the screens until an insect enters the space therebetween. The high voltage output of the transformer 42 is connected to the inner screen 46 to provide an elevated electrical potential to the grid 20. The other lead from the transformer 42 is connected to the outer screen 44 where it is grounded to the housing. The electrified grid 20 surrounds the centrally mounted canister 12 and fluorescent lights 16 and 18 so that the insects will be destroyed as they attempt to reach the sources of the light and chemical attractants.

It is to be understood that the electric motor 36, fluorescent lamps 16 and 18 and the electrified grid 20 are powered by a conventional cord set (not shown) which is connected to a household electric socket. The cord set preferably enters the device 10 through an aperture in the cover 30 and is connected to the motor 36, fluorescent lights 16 and 18 and the transformer 42 by any suitable wiring arrangement.

It is also to be understood that the device is operative so that different combinations of components can be used depending on which components are effective for attracting specific types of insects. For example, a canister charged with a specific insect pheromone is used to attract that specific insect. Also for example, carbon dioxide and/or octenol and infra-red light are used in combination to attract mosquitoes and biting flies. The carbon dioxide and/or octenol which is heated by the infrared lamp simulates the respiration of the insect's animal prey, such as a cow, thereby attracting the insects. Still further, ultraviolet light is used to attract moths. With regard to using different insect attractants, it is contemplated that a photoelectric cell (not shown) will be utilized to enable the user to activate different lights and canisters for day and night uses. For example, the user could activate one fluorescent tube and one canister for day operation and another fluorescent tube and another canister for night operation.

It is seen therefore that the instant invention provides a device for safely and effectively attracting and destroying a variety of different insects. The pressurized canister 12 of the invention can be charged with different insect attractants such as carbon dioxide and/or octenol or specific insect pheromones. By utilizing different types of fluorescent lights, the ability of the device to attract different insects is enhanced. Still further, the ability to activate the attractants in different combinations enhances the effectiveness of the device. The electrified grid surrounding the lights and canister safely and effectively destroys annoying insect pests as they attempt to reach the source of the attractants.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for attracting and destroying insects comprising:
   a pressurized canister charged with an insect attractant comprising an insect pheromone, said canister including means for discharging said insect attractant into the air; and
   electrified grid means surrounding said canister.

2. A device for attracting and destroying insects comprising:
   a pressurized canister charged with an insect attractant comprising octenol, said canister including means for discharging said insect attractant into the air; and
   electrified grid means surrounding said canister.

3. A device for attracting and destroying insects comprising:
   a pressurized canister charged with an insect attractant, said canister including means for discharging said insect attractant into the air;
   electrified grid means surrounding said canister; and
   said discharge means comprising spray means mounted to said canister, and means for periodically actuating said spray means, said means for periodically actuating said spray means comprising rotatable cam means.

4. In the device of claim 3, said cam means comprising an electric motor having a rotating shaft and an eccentric cam mounted on said shaft.

5. A device for attracting and destroying insects comprising:
   a pressurized canister charged with an insect attractant, said canister including means for discharging said insect attractant into the air;
   electrified grid means surrounding said canister; and
   a fluorescent light source, said electrified grid means surrounding said light source.

6. In the device of claim 5, said fluorescent light source comprising ultra-violet light bulbs.

7. In the device of claim 5, said fluorescent light source comprising infra-red light bulbs.

8. In the device of claim 5, said insect attractant comprising carbon dioxide and said light source comprising infrared light bulbs.

* * * * *